W. S. MAYERS.
AUTOMATIC CABLE REEL.
APPLICATION FILED MAY 9, 1910.
1,100,140.
Patented June 16, 1914.
2 SHEETS—SHEET 2.
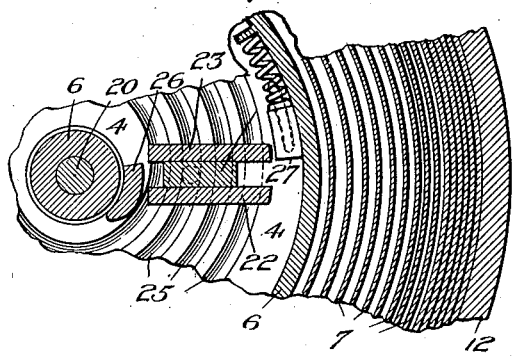
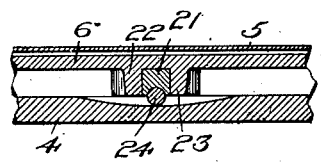
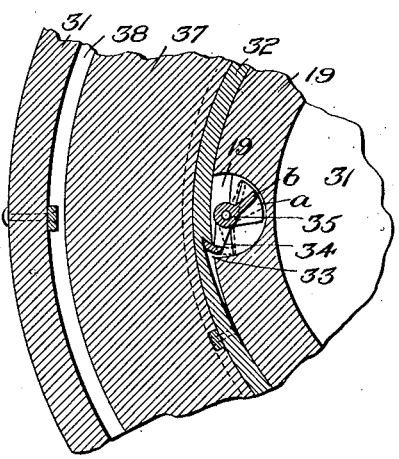
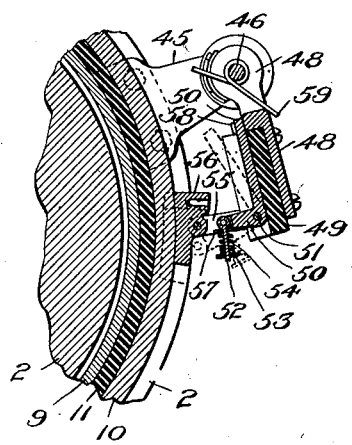
Witnesses
Edwin L Bradford
B G Braun
Inventor
Wilbur S. Mayers
By H. H. Bliss
Attorney

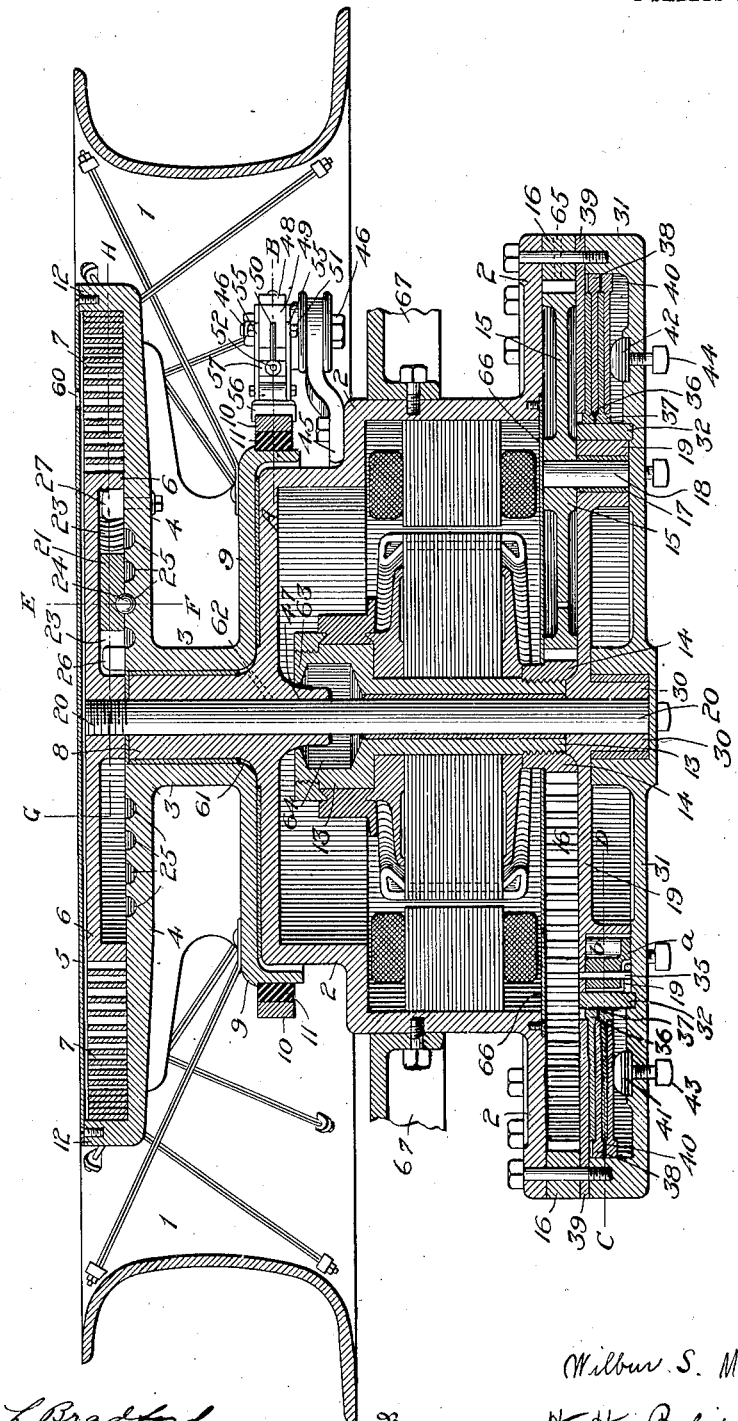

UNITED STATES PATENT OFFICE.

WILBUR S. MAYERS, OF FAIRMONT, WEST VIRGINIA, ASSIGNOR TO THE JEFFREY MANUFACTURING COMPANY, OF COLUMBUS, OHIO, A CORPORATION OF OHIO.

AUTOMATIC CABLE-REEL.

1,100,140.  Specification of Letters Patent.  Patented June 16, 1914.

Original application filed November 18, 1908, Serial No. 463,233. Divided and this application filed May 9, 1910. Serial No. 560,354.

*To all whom it may concern:*

Be it known that I, WILBUR S. MAYERS, a citizen of the United States, residing at Fairmont, in the county of Marion and State of West Virginia, have invented certain new and useful Improvements in Automatic Cable-Reels, of which the following is a specification, reference being had therein to the accompanying drawing.

This invention relates to winding mechanisms and in the drawings, for purposes of illustration, I have shown a winding mechanism of the character adapted for use to control the winding and unwinding of an electrical conductor cable, such as is used for supplying current to an electric locomotive while operating in the side entries or rooms of a mine which are not provided with trolley wires.

In the co-pending application Serial No. 463,233, filed November 18, 1908, of which this application is a division, I have made claim to those features of invention in the structure disclosed on account of which it is especially adapted for locomotive use to wind a conductor cable.

The present invention relates to the structure shown in the drawings considered as a winding mechanism capable of general application and not limited to locomotive use.

Of the drawings, Figure 1 is a vertical sectional view through the center of the reel showing the essential parts. Fig. 2 is a horizontal sectional detail through the line A—B of Fig. 1. Fig. 3 is a horizontal section through the line C—D of Fig. 1. Fig. 4 is a vertical section through the line E—F of Fig. 1; and Fig. 5 is a horizontal section through the line G—H of Fig. 1.

The motor brushes and electrical wiring, being of the usual type, are omitted in the drawings.

Referring to Fig. 1, the cable drum 1 is rotatably mounted upon the motor case 2, and its hub 3 has a top flange 4 which with its cover 5 forms a case for the spring drum 6 and spiral spring 7 hereafter described. The hub 3 is journaled upon the tubular extension 8 of the motor case 2 and has a bottom flange 9 resting upon the top of the motor case and forming a step bearing which supports the drum and cable. On the outer edge of the flange 9 is fixed the collector ring 10 insulated by the fiber ring 11. The inner end of the insulated cable conductor terminates at the collector ring 10 making electrical connection therewith, and if a double conductor cable is used, the inner end of the remaining conductor is electrically connected with the metallic parts of the cable drum.

A flat spiral spring 7 is connected at its inner end with the edge of the spring drum 6, and at its outer end with a rim 12 on the flange 4. The spring is so placed that when wound its force will rotate the drum in a counter clockwise direction.

The armature of the motor is mounted tightly upon the hollow shaft or sleeve 13, and to this sleeve at its lower end is keyed or screwed the pinion 14. This pinion meshes into the planetary gear wheel 15 which also meshes into the stationary internal gear 16. In the bore of the planetary gear 15 there is tightly fitted a stud 18, the lower end of which is journaled into a bearing 17 in the transmission wheel 19, this wheel being tightly fixed to the driving shaft 20, and its rotary motion is transmitted therethrough to the spring drum 6 which is tightly keyed or screwed to the solid shaft, this shaft being free to rotate in the sleeve 13. It will thus be seen that the rotary motion of the armature is transmitted to the drum 1 through the sleeve 13, the pinion 14, the gear wheel 15, the stud 17, the wheel 19, the driving shaft 20, the spring drum 6, and the spring 7, in the order named, the drum rotating at a largely reduced speed.

In practice it sometimes happens that, while the cable is winding upon the drum, the electric power is cut off, in which case both the locomotive driving motors and the reel motor suddenly become inactive. In this case the spring 7, which is always kept under tension when there is any tension upon the cable, will have sufficient stored energy to rotate the drum several times after the reel motor has stopped, thus maintaining the tension upon the cable until the motorman succeeds in stopping the locomotive by braking. The spring 7 has another important office in connection with the operation of the collector brush, to be hereafter described.

It is necessary to limit the number of rotations in both directions of the drum 1 relative to the spring drum 6 in order that the spring 7 may not be over strained or distorted and, for this purpose, I employ a multiple turn stopping mechanism shown in vertical section in Fig. 1 and in vertical section in Fig. 4, as seen from a point 90 degrees in a horizontal direction from the view point in Fig. 1. This stop consists of a small block of hardened steel 21 moving between radial guides 22 and 23 on the spring drum 6, and having on its under side a hemispherical cavity made to fit the steel ball 24. The ball moves in a spiral groove 25 cut in the top of the hub flange 4 under the spring drum 6, so that with the flange stationary, the cable unwinding, and the cable drum rotating against the torque direction of the spring 7, the stop block 21 will be carried by the ball 24 in a radial path toward the center of the drum. With the cable drum rotating in the reverse direction, causing the cable to wind, the stop block 21 will be carried in a radial path away from the center of the drum. When the ball 24 has approached the inner end of the spiral groove 25 the stop block will have been carried toward the center of the drum far enough to engage upon its side the face of the lug 26 lying in a radial plane, thus limiting the travel of the cable drum in that direction relative to the spring drum. In the same manner, when the relative direction of the cable drum is reversed and when the ball has approached the outer end of the spiral groove the stop block will have been carried away from the center of the drum far enough to engage upon its other side the face of the outer lug 27 lying in a radial plane, thus limiting the travel of the cable drum in the other direction. The number of rotations of the cable drum relative to the spring drum between the two described limits depends upon the number of convolutions in the spiral groove. The inner lug 26 is rigidly fixed to the hub flange 4, but the outer lug 27, though attached to said flange, is preferably not rigidly fixed to it, but is slightly movable in a tangential path against a buffer spring, in order to lessen the impact shock in case the tension upon the cable is suddenly removed.

A downward extension 30 of the hub of the transmission wheel 19 is journaled upon the bottom casing 31, forming a bearing for the wheel 19 and the superimposed gearing and armature.

Surrounding the transmission wheel 19 and loosely fitted thereto is a ring 32, having on its concave side a multiplicity of notches 33, forming a ratchet ring to engage the pawl 34. This pawl is mounted within a recess in the rim of the wheel 19, and swings a small distance horizontally upon the pin 35 which is supported at both ends by projecting parts of the wheel 19. The bottom wing $a$ of the pawl extends down to and is in contact at all times with the upper surface of the bottom casing 31, the weight of the pawl casting producing a slight friction between the two members. This friction is utilized in making automatic the action of the pawl, which is as follows: When the wheel 19 is turned in a clockwise direction, in which case the cable is paying out, the frictional resistance between the wing $a$ of the pawl and the bottom casing reacts against the pawl and turns it on its pivot 35 in a clockwise direction, thus causing it to engage the notches 33. However, when the wheel 19 is turned in a counter clockwise direction, the reverse action takes place and the frictional resistance maintains the position of the pawl out of engagement with said notches, as shown by the dotted lines in Fig. 3.

The metal in the pawl shown in section at $b$, Fig. 1, as well as the wing $a$, acts as a counterbalance, thus neutralizing the action of the centrifugal force which would tend to keep the pawl in contact with the ratchet ring 32 while the cable is winding, thereby causing considerable wear.

Surrounding the ratchet ring 32 is a set of multiple rings 36, 37, 38, 39, 40 forming a brake and employing a well known principle. The rings 36 and 37 are keyed to the ratchet ring 32, rotating with it, but free to move in a vertical direction. The rings 40 and 38 are keyed to the casing 31 but free to move in a vertical direction. The ring 39 is clamped between the members 16 and 31, and resists the upward pressure imparted to the lower rings by the flat springs 41, 42. Three or more of these springs are employed and they are tensioned by the screws 43, 44 in the bottom casing.

It is evident that the number of friction rings may be increased or diminished, in this manner varying the frictional retardation beyond the limits of the adjustment given to the flat springs by the screws. It is desirable that this frictional retardation should produce the same tension in the cable while paying out, as that produced by the effective motor torque while winding.

The operation of the flat spiral spring 7, as above described, is dependent upon the combined operation of the pawl 34, the ratchet ring 32, and the friction brake for, without these latter members, the reaction of the spiral spring would rapidly rotate the spring drum 6 and the shaft and gearing connected thereto, in case the electric circuit to or in the motor should be broken while winding the cable thus relieving the tension of the spring and rendering it inoperative.

In electrical contact with the collector ring 10 is the collector brush, Figs. 1 and 2, which is so constructed that the circuit to the small reel motor is broken while the cable is paying out, and closed while the cable is winding, the operation of the brush holder being automatic. The bracket 45 is bolted to the motor case 2 and, at its outer end, carries the stud 46 which is insulated by washers and bushing of fiber in the usual manner. Pivotally secured at the top of the stud 46, and swinging freely thereon is a metal arm 48 which carries on its swinging end a grooved block 49, made of insulating material. In said groove there is placed the switch lever 50 pivotally hung on the pin 51 extending through the block 49. The lever 50 has a short arm making a right angle near the pivot end, and at the end of the short arm is attached a hinge bolt 52 having on its swinging end a thumb screw 53 for tensioning the helical spring 54. A double arm metal link 55 is hung at one end upon the projecting ends of the pin 51 and is pivoted at its other end to the metal collector shoe 56. The two arms of the link 55 are connected by a cross piece 57 having in its center a hole to receive the hinge bolt 52.

Adjacent to the swinging end of the switch lever 50 are two spring clips 58, riveted to the arm 48, one on either side of said lever and making electrical contact therewith when the lever is in the position shown by the full lines in Fig. 2. An adjustable spring 59 maintains the proper pressure of the collector shoe 56 against the collector ring 10 through the arm 48 and the link 55.

The main cable or lead from the driving motors of the locomotive is electrically connected to the collector shoe 56, and the lead from the small reel motor connects electrically with the arm 48.

It will be seen that while the drum is rotating in a counter clockwise direction, with the cable winding, all parts of the collector brush will be held in the position shown by the full lines in Fig. 2 by a certain force due to the friction between the collector ring 10 and the shoe 56, and that electrical connection is made from the reel cable to the reel motor as well as to the driving motors. But when the direction of rotation of the drum is changed to clockwise, with the cable paying out, the friction between said collector ring and shoe causes the latter to advance a short distance in the direction of rotation, carrying with it the link 55 and the switch lever 50, which members will take the position shown by the dotted lines in Fig. 2. When this occurs the electrical connection between the spring clips 58 and the lever 50 is broken, cutting off the current from the reel motor, still maintaining, however, the electrical connection between the reel cable and the driving motors through the various members as above described.

The operation of the switch lever in connection with the link 55, the hinge bolt 52, and the helical spring 54 is that of the ordinary quick break switch. When the collector shoe 56 is in the position shown by the full lines in Fig. 2, with the lever 50 in contact with the spring clips 58, the cable drum is either rotating in a counter clockwise direction or stationary. If the cable drum is now caused to rotate in a clockwise direction the motion imparted to the collector shoe by friction, as above described, is transmitted to the spring 54, through the links 55 and cross piece 57, and the spring is compressed to its limit or to a point where its tension, which is exerted through the thumb screw 53 and hinge bolt 52 to the lever 50, overcomes the frictional retardation due to its contact with the spring clips. When this contact is broken the frictional retardation no longer exists and the lever, being free to move, is quickly thrown into a position beyond arcing distance, shown approximately by the dotted lines. In this manner the electric arc which forms between the lever and the spring clips is quickly extinguished. In its normal position the short arm of the lever 50 is held in contact with the cross-piece 57 by the tension of the spring 54, and their relative positions are changed only during the short time required in opening the switch as above described. When the cable drum starts to rotate in a counter clockwise direction with the switch open the collector shoe, owing to the friction between it and the collector ring, takes the position shown in Fig. 2 by the full lines, and its movement is imparted by the said link and cross-piece to the short arm of the lever, thus forcing its long arm into contact with the spring clips. In connection with the operation of this switch the spiral spring 7 plays an important part. Taking the case where the locomotive has reached the end of its run in which the cable has paid out from the reel. In this case the switch lever 50 will be in the position shown in Fig. 2 by the dotted lines. Now when the locomotive is reversed the circuit to the reel motor would remain broken between the said switch lever and the spring clips were it not for the fact that the spring 7 will rotate the drum and collector ring in a counter clockwise direction to an extent amply sufficient to shift the collector shoe to its other position thus closing the circuit to the reel motor.

The bearings, gear wheels, friction rings, and other moving parts are designed so that their lubrication will be simple and effective, and there is but one oil hole required which is shown at 60 in the spring case cover 5. The oil entering at this point lubricates the spring 7, the disk 6 and the stop block 21, and then passes downward through the bearings, part of it lubricating the drum hub 3 and the step bearing 9, and the remainder passing downward along the solid shaft 20 through the hollow shaft 13 to the bottom of the case. Any excess of oil entering the drum hub bearing collects in the annular cavity 61 and is drained therefrom into the upper bearing of the solid shaft 20 through one or more holes 62. The oil is prevented from reaching the commutator of the motor by the tubular downward extension 47 from the casing 2 into the oil collecting chamber 64. In this chamber any oil which may have collected is held at the outer walls by centrifugal force while the motor armature is rotating and is prevented from rising by the inwardly projecting flange 63. When the armature is at rest this oil gravitates between the solid shaft 20 and the hollow shaft 13, escaping through the step bearing at the bottom of the hollow shaft into the gear case 31. The gear case being oil tight, the oil collects in it up to the overflow 65 from whence it may be piped to a receptacle or elsewhere, and all the gear wheels, friction rings and other parts within the gear case 31 are thus kept immersed in oil.

The annular diaphragm 66, which is closely fitted around the hub of the pinion 14 and tightly screwed to the bottom of the motor casing 2 prevents the splashing of the oil into the motor parts.

It is evident that the direction of rotation of all parts above described may be reversed without changing their functions, provided that the spring 7, the spiral groove 25, the ratchet ring 32, the pawl 34, and the brush holder are also reversed.

The motor casing 2 is secured to a support 67 which forms one of the cover plates over the locomotive frame.

The parts within the motor casing 2 not described above, comprise the armature, pole pieces, and field coils of the motor which may be of any well known construction.

From the foregoing description the construction and operation of the particular embodiment of my invention, which I have selected for purposes of illustration, will be clearly understood, but it is to be borne in mind that my invention is not limited to the particular form of mechanism referred to, but is capable of embodiment in a variety of structures adapted for a wide variety of uses.

What I claim is:—

1. In an automatic cable reel of the character described, a casing, a horizontal transmission wheel, a ratchet ring surrounding it, a pawl carried in said wheel engaging the ratchet ring and resting on the casing, said pawl being actuated by the resistance to movement with the wheel due to friction between it and the casing, substantially as set forth.

2. In a winding mechanism, the combination of a reel, adapted for winding a cable, a motor, a train of power transmitting gearing between the motor and the reel, a friction brake having a rotatable element and a non-rotatable element, and means for automatically connecting the said gearing with the rotatable element of the brake when the reel is rotating in the cable unwinding direction and for automatically disconnecting the rotatable element when the reel is rotating in the cable winding direction.

3. In a winding mechanism, the combination of a reel adapted for winding a cable, a motor, gearing between the motor and the reel, the said gearing comprising a spring adapted to permit movement of the reel relative to the gearing, and means for limiting the number of rotations of the reel in relation to the gearing.

4. In a winding mechanism, a reel, a driving element, a spiral spring connecting them, a multiple turn stopping mechanism for limiting the relative movement of drum and driving element comprising a radial plate or flange on the drum, lugs on the flange, radial guides on the driving element, a stop block moving in a radial path between said guides and at the two limits of the path engaging said lugs respectively, a spiral groove cut in the plane surface of said flange, a ball fitted into a cavity in the said stop block and traveling in the spiral groove in said flange for the purpose of moving the stop block back and forth in its path between the radial guides, substantially as and for the purpose set forth.

5. In a winding mechanism, the combination of a reel adapted for winding a cable, a motor, a train of power transmitting elements connecting the motor and the reel, the said train including an energy storing and expending spring, and automatic means for limiting the action of the spring in the power expending direction.

6. In a winding mechanism, the combination of a reel adapted for winding a cable, a motor, a train of power transmitting elements connecting the motor and the reel, the said train including a spiral spring, and automatic means for limiting both the extent to which the spring can be wound and the extent to which it can be unwound.

7. In a winding mechanism, the combination of a reel adapted for winding a cable, a train of power transmitting elements adapted to rotate the reel, the said train including a spring, and automatic means for positively and unyieldingly connecting elements of the said train otherwise connected only through the spring when the spring tension reaches a predetermined maximum.

8. In a winding mechanism, the combination of a reel adapted for winding a cable, a train of power transmitting elements adapted to rotate the reel, the said train including a spring, and automatic means for positively and unyieldingly connecting elements of the train otherwise connected only through the spring when the spring tension reaches a predetermined minimum.

9. In a winding mechanism, the combination of a reel adapted for winding a cable, a train of power transmitting elements adapted to rotate the reel, the said train including a spring, and automatic means for positively and unyieldingly connecting elements of the train otherwise connected only through the spring when the spring tension reaches a predetermined maximum and also when it reaches a predetermined minimum.

10. In a winding mechanism, the combination of a reel adapted for winding and unwinding a cable, a motor, a train of power transmitting elements between the motor and the reel, a friction brake, means for automatically applying the action of the brake to one of the elements of the said train when the element is moving in the direction corresponding to the unwinding direction of the reel, and an energy storing and expending spring in the said train between the element to which the braking action is applied and the reel.

11. In a winding mechanism, the combination of a reel adapted for winding and unwinding a cable, a motor, a train of power transmitting elements between the motor and the reel, the said train including a spring, and automatic means acting when the motor is deënergized to apply to the end of the spring operatively nearer the motor, a braking action at least equal to the force expended by the spring.

12. In a winding mechanism, the combination of an electric motor, speed reducing gearing and connecting members, a casing surrounding the motor and gearing and the connecting members, a driving shaft projecting from the casing and carrying a spring drum, a reel mounted upon the casing and adapted to be driven by the motor through the said gearing, connecting members and shaft, a spring connection between the spring drum and the reel, and means for automatically restricting the counter-rotation of the members within the casing through reaction of the said spring in case the motor should become deënergized while the reel is rotating in the winding direction.

13. In a winding mechanism, the combination of an electric motor, speed reducing gearing and connecting members, a casing surrounding the said motor gearing and connecting members, a driving shaft projecting from the casing and carrying a spring drum, a cable reel mounted upon the casing and adapted to be driven by the motor through said gearing and connecting members and shaft, a spring connecting the spring drum with the reel, means for limiting the number of rotations of the said reel relative to the spring drum, a wheel mounted upon the driving shaft, a pawl carried by the wheel, a ratchet ring adapted to be engaged by the pawl, a multiple disk brake connected with the ratchet ring and adapted to retard the rotation thereof, and means for adjusting the action of the said brake.

In testimony whereof I affix my signature, in presence of two witnesses.

WILBUR S. MAYERS.

Witnesses:
G. L. ASHMORE,
R. P. HINES.